(12) United States Patent
Muramatsu et al.

(10) Patent No.: US 6,801,624 B2
(45) Date of Patent: Oct. 5, 2004

(54) BAND UNIT FOR ATTACHING HANGERS TO PORTABLE APPLIANCES

(75) Inventors: Hiroshi Muramatsu, Tokyo-to (JP); Hiroyuki Muramatsu, Tokyo-to (JP)

(73) Assignee: Unimex Kabushiki Kaisha, Tokyo (JP)

( * ) Notice: Subject to any disclaimer, the term of this patent is extended or adjusted under 35 U.S.C. 154(b) by 491 days.

(21) Appl. No.: 10/002,143

(22) Filed: Dec. 5, 2001

(65) Prior Publication Data

US 2002/0131587 A1 Sep. 19, 2002

(30) Foreign Application Priority Data

Mar. 19, 2001 (JP) ........................................ 2001/708010

(51) Int. Cl.⁷ ................................................ H04M 1/00
(52) U.S. Cl. ...................................... 379/430; 379/449
(58) Field of Search ................................ 379/430, 449, 379/446, 447, 454, 455; 455/90.1; 224/199, 250

(56) References Cited

U.S. PATENT DOCUMENTS 5,535,928 A * 7/1996 Herring ...................... 224/250
5,620,120 A * 4/1997 Tien ........................... 224/199
5,706,345 A * 1/1998 Allen .......................... 379/430
6,075,857 A * 6/2000 Doss et al. .................. 379/430
6,363,147 B1 * 3/2002 Maxwell ..................... 379/430
6,374,090 B1 * 4/2002 Morales ..................... 455/90.1

* cited by examiner

Primary Examiner—Jack Chiang
(74) Attorney, Agent, or Firm—Rader, Fishman & Grauer PLLC

(57) ABSTRACT

The present invention proposes a band unit for attaching a hanger to a portable appliance having an approximately rectangular or oblong three-dimensional body in front elevation. The band unit comprises a elastic shoulder band, having flexibility, consisting of a intermediate part to be positioned on the top of the body of the portable appliance and both right and left side parts to be placed on the right and left sides of the appliance body, nonskid surfaces respectectively provided on the inner surfaces caused to contact with the appliance body at least on right and left side parts of the shoulder band, a plurality of notches provided on the inner surfaces caused to contact with at least a part of the outer surfaces of both right and left side parts of the shoulder band, at least one expansive elastic band caused to adhere elastically to notches on both right and left side parts of the shoulder band attached to the appliance body a hanger attached to the intermediate part of the shoulder band.

4 Claims, 4 Drawing Sheets

BAND UNIT FOR ATTACHING HANGERS TO PORTABLE APPLIANCES

FIELD OF THE INVENTION

The present invention relates to band unit for attaching various hangers to portable telephones, portable radio sets, radio cassette tape recorders, CD players, digital cameras, pulsimeters, and many other types of portable small-sized appliances.

DESCRIPTION OF THE RELATED ART

In an attempt to hang a portable telephone on an ear in a conversational condition, which portable telephone is provided with a receiver part on the top of the telephone body in front elevation and a microphone part at the bottom thereof in front elevation, the present inventor has heretofore disclosed the hanger for hanging the portable telephone on the ear. The portable telephone is provided with the hole for fitting the strap on the top of the body thereof. In stead of the strap, the temple, capable of being hung on the outer side of ear helix, is fitted into the fitting hole thereof. The temple is in the shape of being similar to letter C. This temple is positioned so that the said receiver part may be placed so as to face the external auditory canal of the ear.

However, the various shapes of portable telephones have thereafter been placed on the market. The strap-fitting holes have come to be positioned in various places. Because of this, there are some portable telephones which become incapable of being hung on the ear, even if are positioned in strap-fitting holes. Even if they can be made to hang on the ear, the receivers may not face the external auditory canal.

SUMMARY OF THE INVENTION

The object of the present invention resides at providing a unit capable of attaching a hanger securely on the various kinds of conventional portable appliances without the help of the hole for attaching the strap.

The present invention proposes a band unit for attaching a hanger to a portable appliance having an approximately rectangular or oblong three-dimensional body in front elevation. This band unit comprises a elastic shoulder band, having flexibility, consisting of a intermediate part to be put on the top of the appliance body and both right and left side parts to be put on the right and left sides of the appliance body, nonskid surfaces provided respectively on the inner surfaces thereof to contact with the appliance body at least on both right and left side parts of the shoulder band, a plurality of notches respectively provided at least on a part of the outer surfaces on both right and left side parts of the shoulder band, a expansive elastic band to be elastically positioned on the notches of both right and left side parts of the shoulder band put on the appliance body and a hanger attached in the intermediate part of the shoulder band.

According to the present invention, the expansive elastic band is positioned on the notches on both right and left side parts of the shoulder band in such condition that the elastic shoulder band provided with the nonskid surfaces is positioned on top, right and left surfaces of the portable appliance body and the elastic band is pressed elastically against the notches on both right and left side parts of the shoulder band. Then, the said shoulder band can be securely positioned on the said body through the combination of the said elastic pressing and the said nonskid action and thereby the hanger can be attached to the portable appliance.

Further, it is advisable to choose the shoulder band longer than normally required. The shoulder band may be positioned on top, right and left surfaces of each of a plural kinds of portable appliances, even if they are different in size. Thus, the same shoulder band may be securely positioned on each of the bodies of a plural kinds of portable appliances.

For the purpose of the present invention, the elastic shoulder band is made from elastic materials, having comparatively soft flexibility, containing such synthetic resin as polyurethane, polyamide, silicone, etc. or elastic materials, having comparatively hard flexibility, containing polyurethane rubber, silicone rubber, butadiene, etc.

Further, referring to the nonskid surface of the shoulder band, the surface provided with some degree of nonskid property may be obtained if the shoulder band is made from elastic material having comparatively soft flexibility, such as rubber, etc.

Preferably, the shoulder band is prepared from those provided with a number of small projections or irregularities on the surface, those coated with latex, silicone, etc. on the shoulder band surface, and those bonded with polyurethane foam, sponge rubber, etc.

Further, the expansive elastic band is preferably caused to contain rubber band made of natural rubber, synthetic rubber, etc., rubber band covered with texture, metal spring ring, etc.

In addition, the hanger attached to the shoulder band includes the temple hung on the ear in the approximate shape of C letter, hook, clip, strap, etc.

DESCRIPTION OF PREFERRED EMBODIMENTS

Figure 1A:
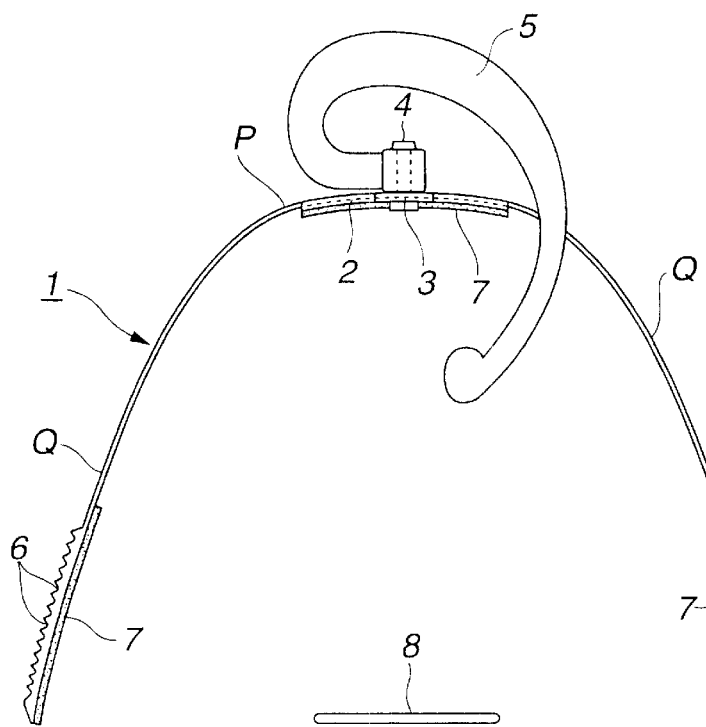
FIG. 1(A) is a view in front elevation of the band unit for attaching a temple to the ear according to the present invention.
Figure 1B:
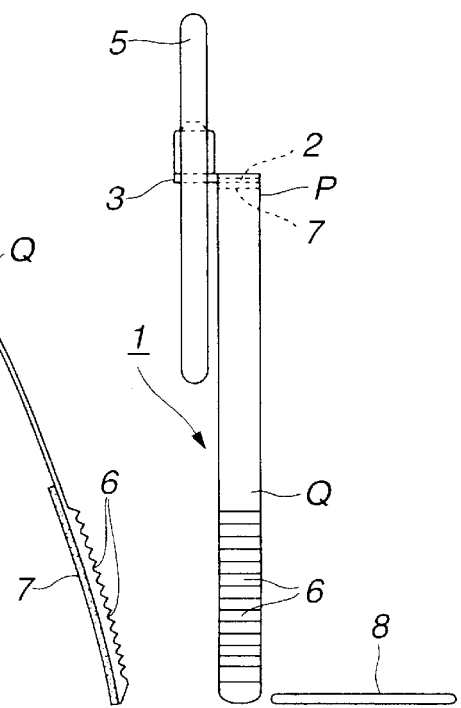
FIG. 1(B) is a view thereof in side elevation.
Figure 1C:
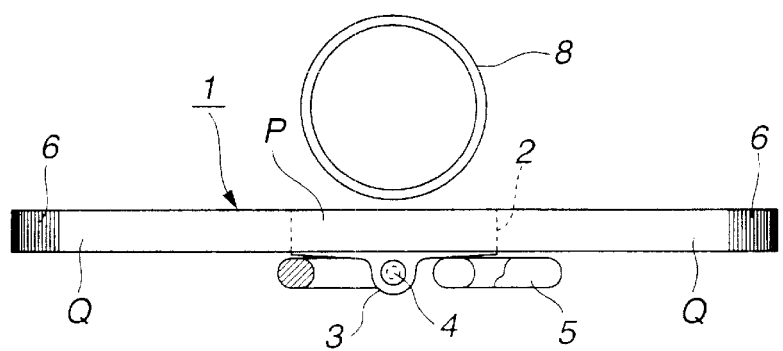
FIG. 1(C) is a fragmentary plane view thereof.

Referring to FIG. 1(A), (B) and (C), the present embodiment of the band unit is used for the portable telephone having the approximately rectangular board-shape body in front elevation.

The shoulder band (1) is a long and fine belt extending in the straight line. This band is made of the elastic material having comparatively hard flexibility containing polyurethane.

The small base board (2), comparatively hard, is caused to adhere to the inner surface of the intermediate part (P) to contact with the top surface of the portable telephone body. Simultaneously, the hanger-fitting axis (4) is projectingly positioned on the protrudent part (3) extending sideways from the intermediate part (P) of the base board (2).

The base of the temple (5) in the shape of approximate C letter to be hung on the ear is rotatively supported on the said axis (4).

A number of notches (6) for holding elastic rubber band are formed in a small scale from each end of both right and left sides on the outer side surfaces of both right and left side parts (Q), (Q) of the shoulder band (1) to contact with the right and left sides of the potable telephone body. Simultaneously, the latex-coated nonskid surfaces (7) are respectively formed on the inner side surfaces of the base board (2) as well as the inner side surface extending in a small scale from the ends of both right and left side parts (Q), (Q) of the band (1).

Figure 2:
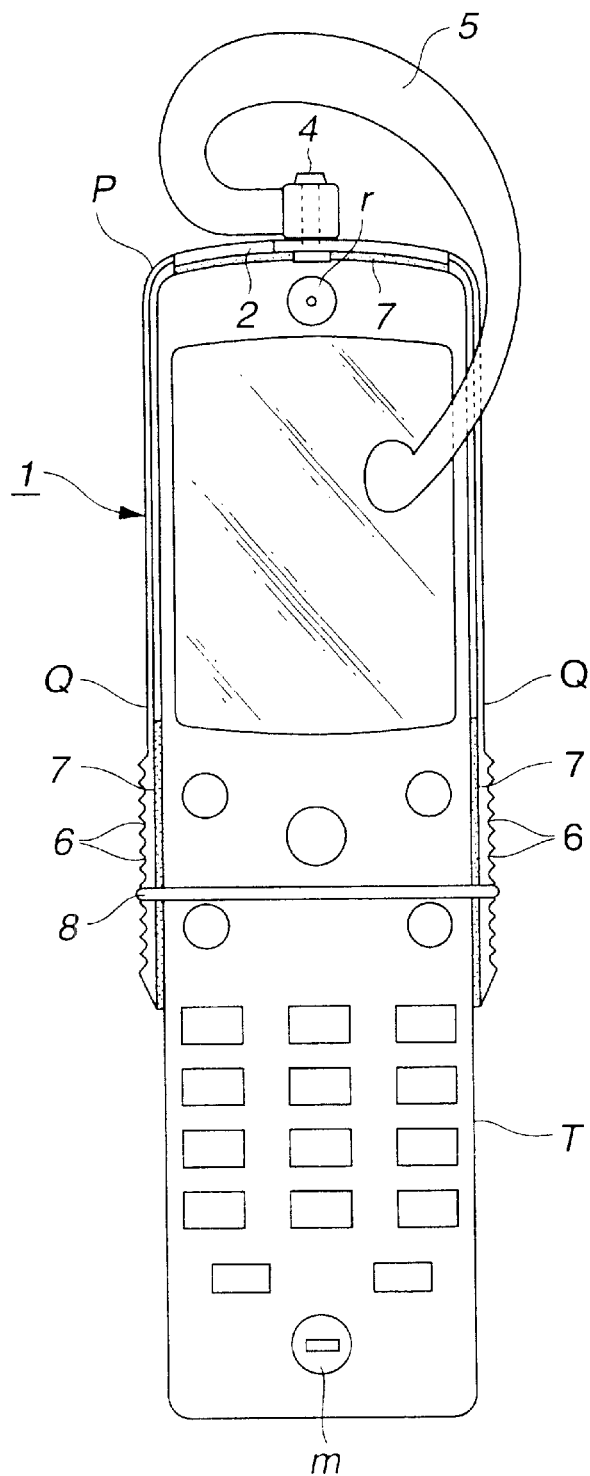
FIG. 2 is a view in front elevation showing the band unit for attaching the hanger, according to the present invention, installed in the portable telephone.

Referring to the band unit used for the portable telephone (T) provided respectively with a receiver part (r) on the top of the telephone body in front elevation and a microphone part (m) at the bottom thereof in front elevation, the nonskid surfaces (7) in the intermediate part (P) of the shoulder band (1) are caused, as shown in FIG. 2, to contact with the top of the telephone body. Then, both right and left side parts (Q), (Q) of the shoulder band (1) are bent along the shoulder part of the telephone body and are caused to contact with surfaces on both right and left sides of the telephone body. Thus, the nonskid surfaces (7), (7) of both right and left side parts (Q), (Q) are caused to contact with the right and left surfaces of the telephone body. In this state, the rubber band (8) is pressed upon the notches (6) and (6) of both right and left side parts (Q), (Q) of the shoulder band (1) as shown in FIG. 2. Thereby, both the side parts (Q), (Q) of the band (1) are elastically attached to the right and left sides of the telephone body. The shoulder band (1) is held on the telephone (T) by the combination of nonskid action of the nonskid surfaces (7), (7) and (7) with the elastic pressing of the said rubber band (8).

As mentioned above, the temple (5) attached on the portable telephone (T) by way of the shoulder band (1) is hooked on the outer side of the ear helix. The telephone is caused to hang on the ear in such manner that the front part thereof faces the ear. The receiver part (r) of the telephone (T) is caused to face the external auditory canal of the ear and the microphone part (m) is positioned lower the ear. Thus, it becomes serviceable while it hangs on the ear.

Figure 3:
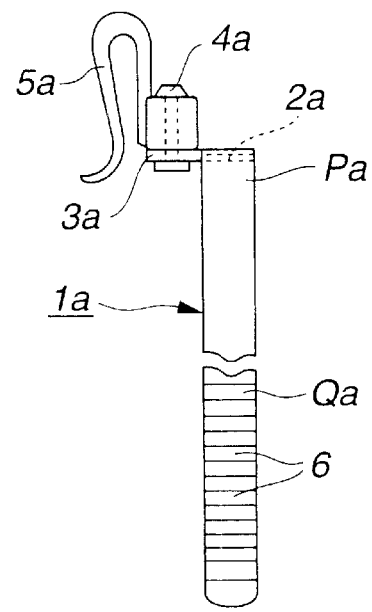
FIG. 3 is a fragmentary view in side elevation of the other embodiment.

The other embodiment in FIG. 3 shows that the base part of a hook (5a) is rotatively supported on the hanger-fitting axis (4a). The remainders of the structure are substantially the same as those shown in FIG. 1(A), (B) and (C).

Figure 4:
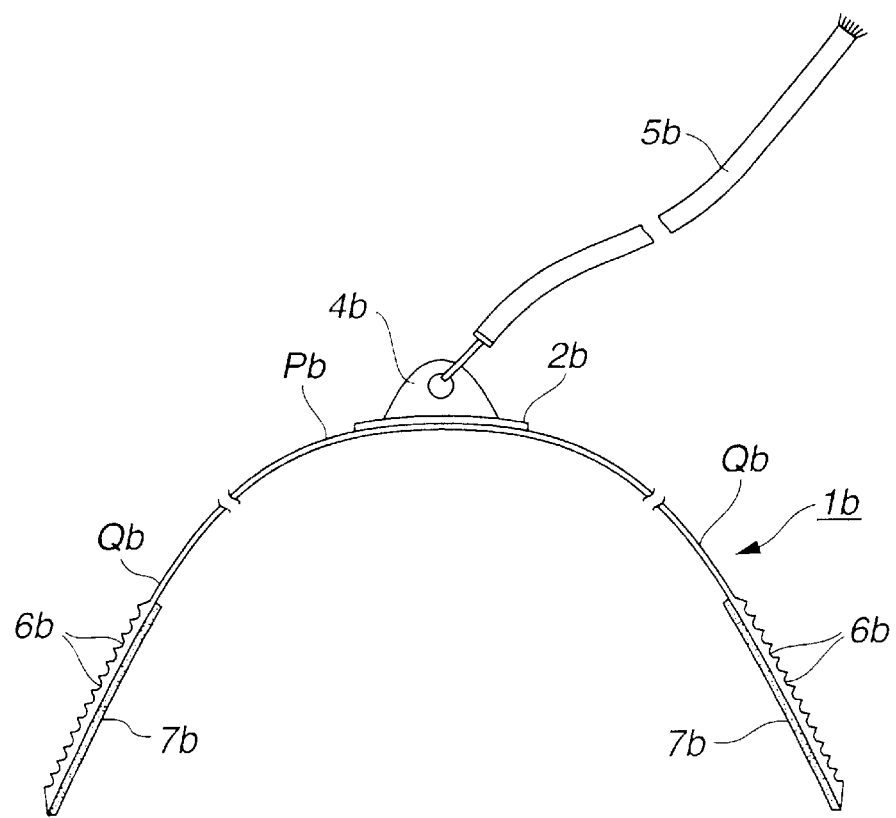
FIG. 4 is a view in front elevation of the further other embodiment.

Referring to the further other embodiment in FIG. 4, a hunger-fitting bracket (4b) is protrusively positioned on the base board (2b) attached to the outer surface of the intermediate part (Pb) of the shoulder band (1b). The base of a strap (5b) is connected with a hole of the bracket (4b). The remainders of the structure are substantially the same as those shown in FIG. 1(A), (B) and (C).

Figure 5:
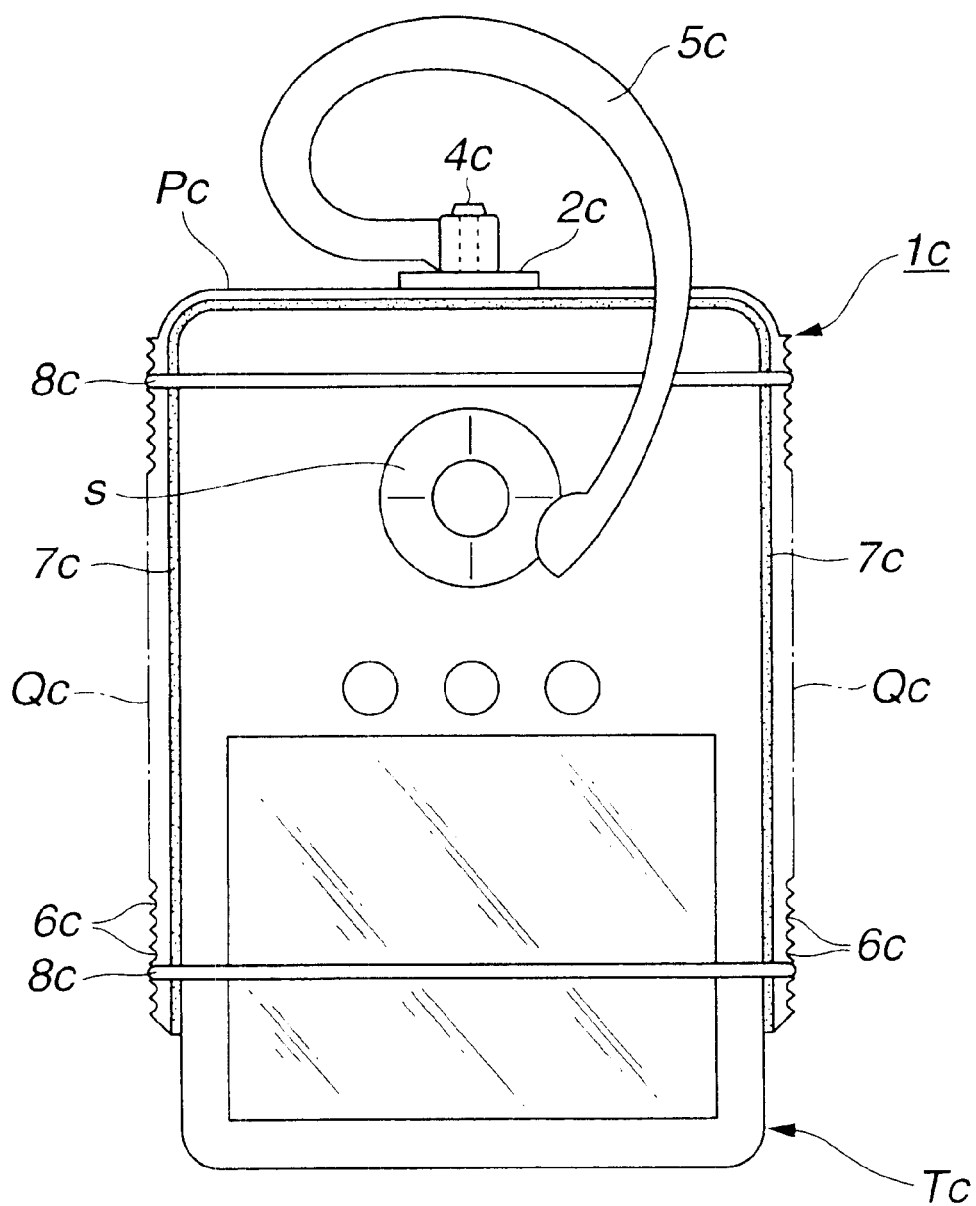
FIG. 5 is a view in front elevation showing the still further other embodiment installed in a CD player.

Referring to the still further other embodiment in FIG. 5, a number of notches (6c) for holding the elastic rubber bands (8c) are formed on the outer surfaces of both right and left side parts (Qc), (Qc) of the shoulder band (1c), extensively extending from the ends thereof. Simultaneously, the nonskid surfaces (7c) are formed on the entire inner surface of the shoulder band (1c). The remainders of the structure are substantially the same as those shown in FIG. 1(A), (B) and (C). In application, the band unit is put on a CD player (Tc) having a rectangular board-shape body provided with a speaker part (s) on the top thereof with two (2) pieces of rubber band (8c), (8c).

What is claimed is:

1. A band unit for attaching a hanger to a portable appliance having a approximately rectangular or oblong three-dimensional body in front elevation, comprising a elastic shoulder band, having flexibility, consisting of a intermediate part to be positioned on the top of said portable appliance body and both right and left side parts to be placed on the right and left sides of said appliance body, nonskid surfaces respectively provided on the inner surface to contact with said appliance body at least on both right and left side parts of said shoulder band, a plurality of notches respectively provided at least on a part of the outer surfaces of both right and left side parts of said shoulder band, at least one expansive elastic band caused to adhere elastically to notches on both right and left side parts of said shoulder band positioned on said appliance body and a hanger attached to said intermediate part of said shoulder band.

2. The band unit according to claim 1 in which said nonskid surface is further provided on the inner surface caused to contact with said appliance body in the intermediate part of said shoulder band.

3. The band unit according to claim 1 in which said nonskid surface is provided on the entire inner surface caused to contact with said appliance body in the intermediate part of said shoulder band.

4. The band unit described in either one of claims 1, 2 and 3 in which said notches are provided in a large number extensively extending from the ends of the outer surfaces of both right and left side parts of said shoulder band.

\* \* \* \* \*